United States Patent
Yuasa et al.

[11] Patent Number: 6,130,008
[45] Date of Patent: *Oct. 10, 2000

[54] ALKALINE STORAGE BATTERY

[75] Inventors: Kohji Yuasa, Chigasaki; Yasuhiro Nitta; Kaori Gomikawa, both of Fujisawa, all of Japan

[73] Assignee: Matsushita Electric Industrial Co., Ltd., Osaka-fu, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/015,833

[22] Filed: Jan. 29, 1998

[30] Foreign Application Priority Data

Apr. 23, 1997 [JP] Japan .................................. 9-105612
Oct. 31, 1997 [JP] Japan .................................. 9-300122

[51] Int. Cl.[7] ...................................................... H01M 2/16
[52] U.S. Cl. ........................... 429/250; 429/247; 429/249
[58] Field of Search .................................. 429/247, 249, 429/250

[56] References Cited

U.S. PATENT DOCUMENTS 3,427,206  2/1969  Scardaville et al ..................... 429/144
5,425,865  6/1995  Singletone et al. ..................... 204/252
5,578,400  11/1996 Gineste et al. ......................... 429/249

FOREIGN PATENT DOCUMENTS 0 848 436 A2  6/1998  European Pat. Off. .
55-096554     7/1980  Japan .
55-105962     8/1980  Japan .
6-196141      7/1994  Japan .

*Primary Examiner*—Maria Nuzzolillo
*Assistant Examiner*—Tracy Dove
*Attorney, Agent, or Firm*—Akin, Gump, Strauss, Hauer & Feld, L.L.P.

[57] ABSTRACT

An alkaline storage battery with improved cycle life and self-discharge characteristics is disclosed. The battery comprises a positive electrode, a negative electrode, a separator and an alkaline electrolyte. For the separator, a material of a woven or nonwoven fabric sheet or a porous film of polyolefine resin of which surfaces have been modified with a hydrophilic compound having a carboxyl group by graft-polymerization. The quantity of carbonates inside the battery is regulated to 150 mg/Ah battery capacity. The quantity of carbonates inside the battery can be regulated to a minimum by optimizing graft polymerization and subsequent washing conditions.

9 Claims, 4 Drawing Sheets

ALKALINE STORAGE BATTERY

BACKGROUND OF THE INVENTION

The present invention relates to an improvement of alkaline storage batteries, particularly to an improvement of the characteristics of a separator for use in such batteries.

A nickel-cadmium storage battery (hereinafter referred to as "Ni—Cd battery") is a known representative alkaline storage battery. Compared to other lead acid storage batteries, since the Ni—Cd battery has a higher energy density per unit weight as well as unit volume and is highly reliable in terms of cycle life, etc. as a power source for portable equipment, it has been widely applied as a power source for a variety of portable equipment.

However, there is an earnest desire for the development of a novel storage battery as a power source for portable equipment that is identical to the Ni—Cd battery with respect to the reliability but has an even higher energy density. It is the recent trend to use a high capacity Ni—Cd battery which has a 1.3-fold or larger capacity compared to the conventional Ni—Cd battery or a nickel-metal hydride storage battery which includes as the negative electrode a powder of a hydrogen storage alloy capable of electrochemically absorbing and desorbing a large quantity of hydrogen in place of a cadmium negative electrode for use in the Ni—Cd battery.

Widely used conventional separator materials for alkaline storage batteries include woven or nonwoven fabric sheets of polyamide resin fibers. The materials as a separator for alkaline storage batteries are required to satisfy the requisites of adequate mechanical strength, high gas permeability, sufficient electrolyte absorbing capacity, high alkali resistance, and high oxidation resistance. Woven and nonwoven fabric sheets of polyamide resin fibers are excellent in mechanical strength, gas permeability, and electrolyte absorption but poor in alkali resistance and oxidation resistance. Accordingly, under severe battery use conditions such as high temperature or extremely long use, those materials are decreased in mechanical strength as a separator, which leads to the induction of short-circuiting inside the battery including such separator material. Furthermore, if this battery is stored in a high temperature environment or is exposed to frequent overcharges that would cause evolution of oxygen gas, the polyamide resin fibers constituting the separator may be decomposed. As a result, self-discharge of the battery is advanced due to oxidation-reduction of the resultant decomposition products, and the discharge performance of the battery is impaired.

Therefore, polyolefine resins such as polypropylene and the like have been drawing attention as a material for separators that has adequate heat-resistance and does not decompose even in a high concentration of alkaline electrolyte at high temperature.

However, the polyolefine resins are poor in hydrophilicity and have a drawback in terms of electrolyte absorption which is a requisite for a separator material for use in batteries. In view of the drawback, there exist following proposed methods for imparting a hydrophilic property to the polyolefine resins:

1) Surface treatment of resin fibers with a surfactant,

2) Immersion of polyolefine resins in fuming or concentrated sulfuric acid to incorporate sulfone groups into the resins, and 3) Modification of a substance, for instance, acrylic acid and the like by a graft-polymerization technique, which has hydrophilic groups including carboxyl group, etc.

In the method 1), when the surfactant-treated polyolefine resin separator is brought into contact with oxygen gas evolving at the positive electrode upon overcharging in a highly concentrated alkaline electrolyte at high temperature, the surfactant is released from the surfaces of polyolefine resin fibers which results in impaired electrolyte absorption of the polyolefine resin separator. As a result, the cycle life characteristic of the battery including such a separator is also impaired. Moreover, addition of a large amount of surfactant adversely affects a battery storage characteristic, because it causes self-discharge of alkaline storage batteries.

The method 2) is advantageous in that the hydrophilic property can be imparted to the polyolefine resin separator with ease and disadvantageous self-discharge characteristic of the battery can be improved drastically. However, the drawback involved in this method is that uniform incorporation of sulfone groups throughout a woven or nonwoven fiber fabric sheet or a porous film of polyolefine resin is difficult, which easily leads to nonhomogeneous hydrophilicity of the resin as a separator. Although there is a tendency that the more the incorporated sulfone groups, the less the self-discharge of the battery, incorporation of large amounts of sulfone groups inversely decreases the mechanical strength of the resin separator at the sulfonated portions. With respect to the electrolyte absorption of the polyolefine resin as a separator, it is inferior to conventional nonwoven polyamide fabric separators.

On the other hand, the method 3) is effective because it permits uniform and firm incorporation of hydrophilic groups onto the entire surfaces of the polyolefine resin and ensures an electrolyte absorption equivalent to that of the nonwoven polyamide fabric separator. In addition, similar to the sulfone groups in the method 2), the more the incorporated amount of carboxyl groups, the less the self-discharge of the battery, and the battery storage characteristic can be improved. Incorporation of carboxyl groups would not strongly impair the mechanical strength of the resin as a separator.

However, the resin material as a separator imparted with the hydrophilic property by the method 3) is characterized by the number and length of graft-polymerized branches and the distributed locations of graft polymerized branches. This means that the characteristics of the separator produced from such a material, particularly in the stability of graft modifiers, depend on the conditions of X-ray or electron beam irradiation onto the surfaces of resin in order to secure polymerization-active sites, conditions in conducting graft polymerization including modifying monomer concentration, reaction temperature and the like, and subsequent washing treatment. This further leads to such drawbacks that repeated charge/discharge cycles of the battery including such a separator deteriorate graft-modifiers incorporated in the separator due to oxidation, which in turn decreases the cycle life of the battery.

BRIEF SUMMARY OF THE INVENTION

The primary object of the present invention is to solve the above-mentioned problems involved in the conventional technology and provide an alkaline storage battery which is less impaired in cycle life characteristic as well as capacity retention ratio due to self-discharge, by using, as a separator, a woven or nonwoven fabric sheet or a porous film of polyolefine resin of which surfaces have been modified with a certain amount of a hydrophilic compound which would not develop oxidation-associated collapses even after repeated charge/discharge cycles.

Another object of the present invention is to provide an alkaline storage battery comprising a separator of a woven or nonwoven fabric sheet or a porous film mainly composed of polyolefine resin of which surfaces have been modified with a hydrophilic compound having a carboxyl group by graft-polymerization, wherein a quantity of carbonates permitted to exist inside the battery is regulated to not more than 150 mg/Ah battery capacity.

In a preferred mode of the present invention, a graft modification ratio (hereinafter referred to as "graft ratio") of the hydrophilic compound to the whole separator material is 4 to 16 wt %.

In another preferred mode of the present invention, the hydrophilic compound having a carboxyl group includes at least one of acrylic acid and methacrylic acid and a graft ratio of the hydrophilic compound to the whole separator material is 7 to 11 wt %.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
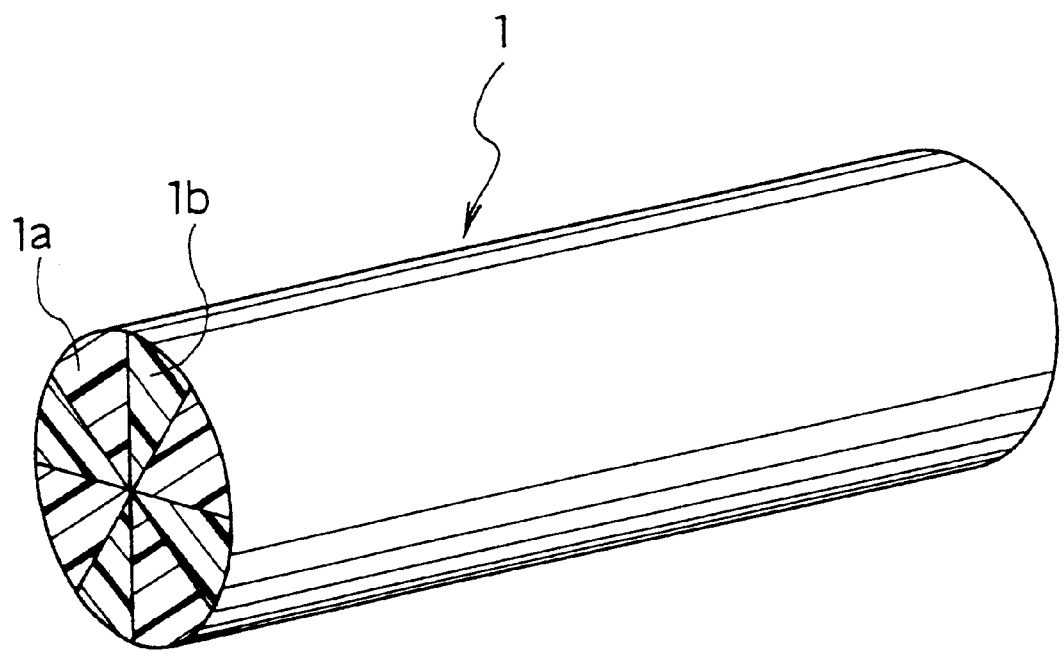
FIG. 1 is an oblique perspective view showing a segmented composite fiber for constituting a separator used in embodiments of the present invention.

As described above, the alkaline storage battery in accordance with the present invention uses as the separator a material of a woven or nonwoven fabric sheet or a porous film mainly composed of polyolefine resin of which surfaces have been modified with a hydrophilic compound having a carboxyl group by graft-polymerization, wherein a quantity of carbonates permitted to exist inside the battery is regulated to not more than 150 mg/Ah battery capacity.

The carboxyl groups, which are present in the form of free or incompletely graft-polymerized hydrophilic compounds inside the separator resin material, are oxidized and degraded with the progress of charge/discharge cycles of the battery including this separator and are converted to carbonates. Then, the converted carbonates act to oxidize and inactivate a hydrogen storage alloy powder as a major constituent of a metal hydride negative electrode, or react with cadmium as an active material of a cadmium negative electrode to form cadmium carbonate, thereby causing impaired cycle life characteristic of the negative electrode.

The present invention controls the amount of adverse carbonates remaining inside the battery below a specific level thereby to improve the cycle life characteristic of the battery.

Effective methods to control the amount of carbonates include a reduction of an amount of non-reacted unstable polymerization products of hydrophilic compounds having carboxyl groups by optimizing conditions of graft polymerization onto the surfaces of the resin as the separator or a sufficient removal of residual nonreacted products or homopolymers of the hydrophilic compound after graft polymerization by means of subsequent washing treatment.

The cycle life of the battery can be improved further if the amount of carbonates inside the battery is suppressed to not more than 60 mg/Ah battery capacity. In consideration of industrial feasibility of separator production (graft polymerization and subsequent washing treatment), it is difficult to decrease the amount of carbonates inside the battery to not more than 20 mg/Ah battery capacity, so that it is most preferable to regulate the amount to 20 to 60 mg/Ah.

By graft-polymerizing the hydrophilic compound onto the surfaces of the polyolefine resin as a main constituent of the separator in a ratio of 4 to 16 wt % to the whole separator material, the electrolyte absorption of the separator can be improved and self-discharge of the battery including such separator can be reduced to a minimum.

The higher the graft ratio, the less the self-discharge of the battery. In other words, there is a tendency of a higher ratio of the retained discharge capacity to the initial value even after storage of the battery. Graft ratios of not less than 4 wt % ensure a capacity retention ratio of not less than 60% after storage of the battery in charged state at 45° C. for 2 weeks. These ratios are useful from the aspect of industrial feasibility. However, graft ratios exceeding 16 wt % are not practical from the aspect of industrial feasibility of separator production, because such ratios require much labor in order to sufficiently remove nonreacted products of hydrophilic compounds having carboxyl groups or their homopolymers remaining after graft polymerization in the subsequent washing process.

In consideration of industrial feasibility of separator production, in addition to the capacity retention ratio and charge/discharge cycle life of the batteries using separators produced, the most preferable range of graft ratio of the hydrophilic compound onto the surfaces of the resin as a separator to the whole separator material is 7 to 11 wt %.

In the following, the present invention will be described by way of specific embodiments In the below-mentioned examples, a nickel-metal hydride storage battery using a separator of a nonwoven fabric sheet of polypropylene fibers of which surfaces have been modified with acrylic acid by graft-polymerization (hereinafter abbreviated to "AGPP") was used.

AGPP was produced in the following procedures. First, a segmented composite fiber having a cross-section where polypropylene (hereinafter abbreviated to "PP") fibers and polyethylene (hereinafter abbreviated to "PE") fibers are alternately arranged as shown in FIG. 1 was prepared. The segmented composite fiber thus prepared is further subdivided into 4 PP fibers $1a$ and 4 PE fibers $1b$ by a subsequent segmentation treatment. Each of these subdivided PP and PE fibers $1a$ and $1b$ has a nominal filament diameter of 4.7 $\mu$m. Separately, a core sheath fiber comprising PP fibers as a core and a sheath of PE fibers for covering the PP fiber core was prepared; the resultant core sheath fiber has a nominal filament diameter of 9 $\mu$m.

Then, the segmented composite fiber with a thin filament diameter and the core sheath fiber with a thick filament diameter were dispersed in an aqueous dispersion medium containing no binder and the dispersed fibers were scooped in a wire cloth to form a primary nonwoven fabric sheet. In a next step, the primary nonwoven fabric sheet was placed in a sufficient amount of running tap water to cause subdivision of the segmented composite fiber into fibers on one hand and to cause mutual intermingling of all fibers including those subdivided fibers, which gave a secondary nonwoven fabric sheet. In this way, a nonwoven fabric sheet, with a basis weight of 55 g/m$^2$ and a thickness of 150 $\mu$m, was obtained. Here, a ratio of the thin filament fiber to the thick filament fiber was 80:20 in a weight ratio.

A solution for polymerization containing 20 wt % acrylic acid, 65 wt % distilled water, 0.5 wt % benzophenone, 0.3 wt % Mohr's salt, 13.7 wt % methoxyethanol and 0.5 wt % nonionic surfactant was prepared. The solution was de-oxidized with nitrogen in order to best eliminate the effect of oxygen on the subsequent polymerization treatment. The previously formed secondary nonwoven fabric sheet was immersed in this solution for 10 min.

The nonwoven fabric sheet which had been immersed in the solution was picked up and excess solution was removed, then it was modified with acrylic acid by irradiating ultraviolet ray onto both surfaces of the fabric sheet for 2 min in a de-oxidized atmosphere, using low pressure mercury lamps (output rate: 110 Watt), each placed 5 cm distant from the respective surface. The temperature of the fabric sheet was kept at 90° C. throughout the ultraviolet ray irradiation. Subsequently, the irradiated fabric sheet was washed in running distilled water at 60° C. for 10 min, followed by further rinsing in running methanol. The aim of the washing and rinsing process was to remove impurities such as homopolymers of nonreacted acrylic acid, surfactant, ferrous element contained in the Mohr's salt, etc. As regards the washing water, running water is more effective than still water. As regards the washing time, the longer the better in order to remove nonreacted products and impurities from the intersections of fibers by washing the resin material. Subsequently, the graft-polymerized nonwoven fabric sheet was dried and calendered, which gave an AGPP, with a basis weight of 60 g/m$^2$ and a thickness of 150 $\mu$m.

Here, the graft ratio of acrylic acid to the whole AGPP is defined as the graft modification ratio (graft ratio) as determined from the following equation:

$$\text{Graft ratio} = (W_1 - W_0) \times 100 / W_0$$

where $W_0$ represents a separator weight before graft polymerization and $W_1$ represents a separator weight after graft polymerization.

The graft ratio of the acrylic acid to the above-mentioned nonwoven fabric sheet was 9 wt %.

Then, various AGPP's used as separators were produced by varying concentrations of respective components of the solution for polymerization, immersing time in this solution, ultraviolet ray irradiation time, and washing conditions in performing the above-mentioned graft polymerization. Subsequently, by using those AGPP's as separators, nickel-metal hydride storage batteries were produced in the following manner.

First, positive electrodes were produced as follows; 7 parts by weight of a cobalt hydroxide powder were mixed with 100 parts by weight of nickel hydroxide powder incorporated therein with zinc and cobalt, and water was added to the resultant mixture as a dispersion medium and kneaded to form a paste. The paste was filled into a porous foamed nickel substrate, and the substrate was dried and pressed. Subsequently, the substrate was immersed in an aqueous dispersion of a fluorocarbon resin powder and dried, which was then cut to strips with a desired size. In this way, positive electrode plates each having a theoretical electric capacity of 1,800 mAh were produced.

Then, to prepare negative electrodes, a hydrogen storage alloy having a CaCu$_5$ type crystal structure represented by the formula MmNi$_{3-55}$Mn$_{0-4}$Al$_{0-3}$Co$_{0-75}$, where Mm represents a mixture of rare earth elements, was pulverized into fine powders with a mean particle diameter of about 25 $\mu$m using a ball mill. The fine powders were immersed in a KOH aqueous solution at 80° C. for one hour and washed with water, which were then mixed with an aqueous dispersion of styrene-butadiene rubber, carboxymethyl cellulose, a carbon powder and water and kneaded to form a paste. The paste was applied onto a nickel-plated iron perforated metal and dried. Subsequently, the metal was pressed and cut to strips with a desired size, which gave negative electrode plates each having a theoretical electric capacity 1.4-fold of the positive electrode.

Each of the positive electrode plates and each of the negative electrode plates thus produced were combined with an AGPP separator which has a length twofold +40 mm of the positive electrode plate in order that it can cover both surfaces of the positive electrode, and the combination was spirally wound and placed in a battery case of iron. After filling 2.3 ml of an alkaline electrolyte into the battery case, an opening of the case was sealed with a gasket and a sealing plate provided with a positive terminal, which gave a 4/5 A size nickel-metal hydride storage battery having a nominal electric capacity of 1,800 mAh. The alkaline electrolyte used was prepared by dissolving 40 g/l LiOH.H$_2$O in a KOH aqueous solution with a specific gravity of 1.30.

All the batteries thus produced underwent cycle life tests 1 and 2, and self-discharge test, after 3 preliminary charge/discharge cycles in an ambient temperature of 20° C.

Cycle Life Test 1

In this test, 6 AGPP's A–F listed in Table 1 were prepared by using the graft ratio of 9 wt % of the acrylic acid to the whole AGPP, as applied in the previously prepared AGPP, and varying the washing times in running distilled water and methanol for removing nonreacted products and impurities after graft polymerization. Nickel-metal hydride storage batteries were prepared using either of the AGPP separators A–F, and those batteries including the corresponding separators were named A–F. Using the respective batteries, cycle life test 1 was performed. The test 1 was performed by repeating charge/discharge cycles where batteries were charged at a current of 1.8 A (1 CA) for 72 min and discharged at a current of 1.8 A (1 CA) until the terminal voltage decreases down to 1.0 V, both in an ambient temperature of 20° C.; the cycle life of the respective batteries A–F was defined as the cycle counts until the discharge capacity dropped to 60% or less of the value at the 1st cycle. The carbonates inside the batteries upon termination of their cycle life were quantitated in the following procedure.

First, the electrode plate groups were collected from disassembled batteries and kept in 100 ml of pure water at 60° C. for 1 hour to extract the electrolyte. Subsequently, the extracted electrolyte was titrated with 0.1 N HCl using phenolphthalein and methyl orange as indicators to quantitate the carbonates in the electrolyte. The respective value obtained by this titration was defined as the quantity of carbonates upon termination of the cycle life of the respective battery. A series of manipulations from battery disassembling to quantitative analysis of carbonates were done in a nitrogen gas atmosphere free from air in order to avoid the influence of carbon dioxide in the air that might invade during analysis. In this connection, the quantity of carbonates derived from carbon dioxide in the invading air during battery assembling is not more than 5 mg/Ah battery capacity or so.

Table 1 lists the washing conditions after graft polymerization of the separator materials, cycle life characteristic of the 6 batteries A–F including those separators and quantities of carbonates inside the respective batteries per Ah battery capacity upon termination of the cycle life after the cycle life test 1.

TABLE 1

| Battery | Separator washing conditions | | Cycle life characteristic (cycles) | Intra-battery quantity of carbonates (mg/Ah) |
|---|---|---|---|---|
| | Washing time in distilled water (min) | Washing time in methanol (min) | | |
| A | 1 | 1 | 150 | 187 |
| B | 2 | 2 | 250 | 148 |
| C | 3 | 3 | 275 | 109 |
| D | 5 | 5 | 330 | 59 |
| E | 10 | 10 | 340 | 41 |
| F | 20 | 20 | 348 | 22 |

Figure 2:
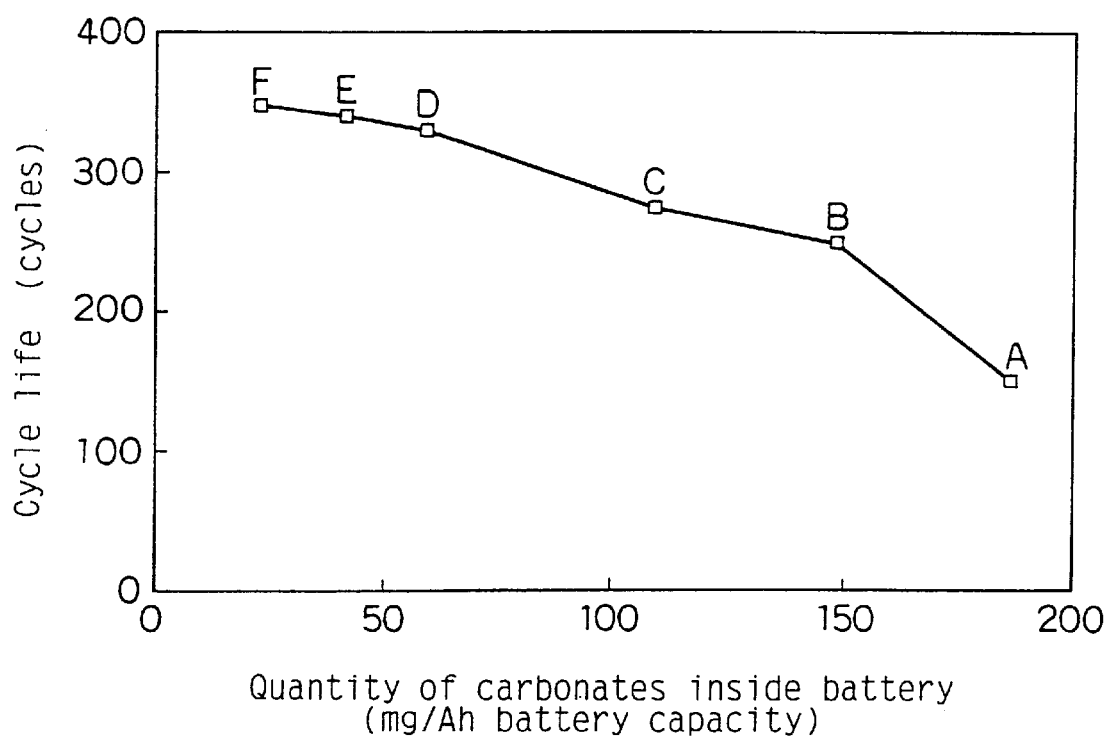
FIG. 2 is a diagram showing a relation between a quantity of carbonates inside battery/Ah battery capacity and a cycle life characteristic in batteries used in a cycle life test (1) in embodiments of the present invention.

FIG. 2 shows the relation between the quantity of carbonates inside the batteries per Ah battery capacity upon termination of the battery cycle life and the cycle life characteristic after the cycle life test 1. As seen from FIG. 2, favorable removal of nonreacted acrylic acid homopolymers, surfactant, and impurities such as iron element and the like in the Mohr's salt by vigorously washing the separator materials after graft polymerization resulted in a reduction of the quantity of carbonates after the cycle life test. This showed that the separator materials thus treated have contributed to improved cycle life characteristic of the batteries including those separators.

Cycle Life Test 2

Subsequently, another series of batteries A–F were produced again in the same manner as stated above, and challenged with a cycle life test 2 under different test conditions from those of the cycle life test 1. The test 2 was performed by repeating charge/discharge cycles where batteries were charged at a current of 180 mA (0.1 CmA) for 15 hours and discharged at a current of 360 mA (0.2 CmA) until the terminal voltage decreases down to 1.0 V, both in an ambient temperature of 20° C.; the cycle life of the respective batteries was defined as the cycle counts until the discharge capacity dropped to 60% or less of the value at the 1st cycle.

Table 2 lists the quantities of carbonates inside the respective batteries A–F per Ah battery capacity upon termination of their cycle life.

TABLE 2

| Battery | Cycle life characteristic (cycles) | Intra-battery quantity of carbohates (mg/Ah) |
|---|---|---|
| A | 500 | 192 |
| B | 680 | 140 |
| C | 730 | 112 |
| D | 840 | 55 |
| E | 880 | 38 |
| F | 910 | 24 |

Figure 3:
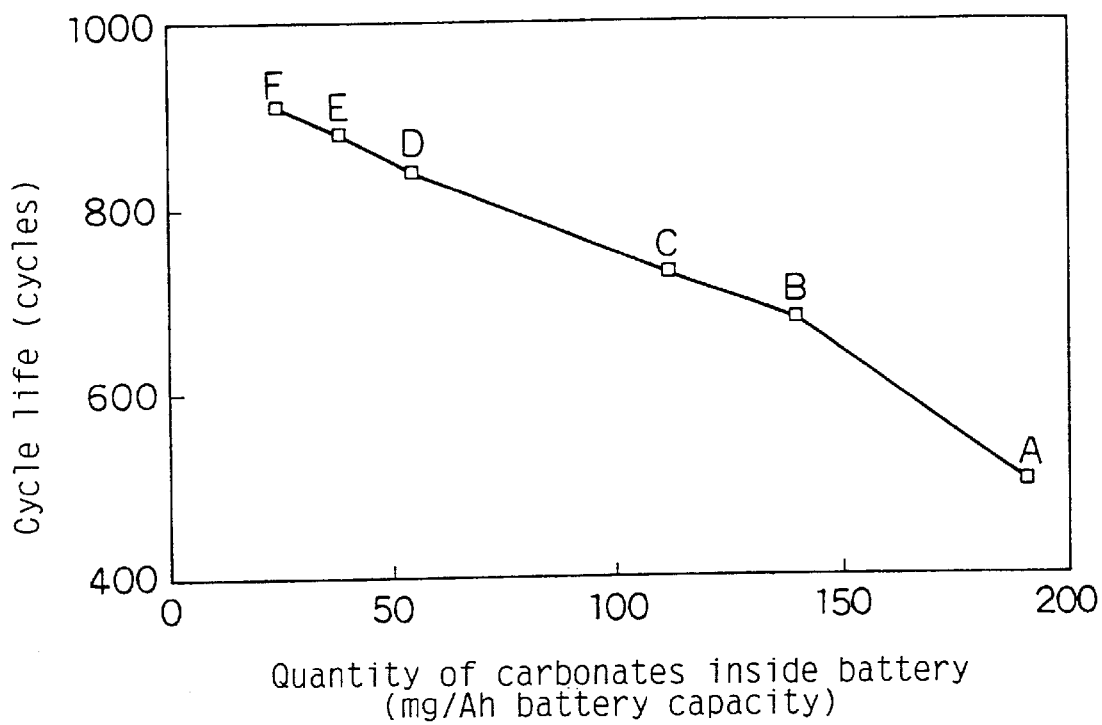
FIG. 3 is a diagram showing a relation between a quantity of carbonates inside battery/Ah battery capacity and a cycle life characteristic in batteries used in another cycle life test (2) in embodiments of the present invention.

In addition, the relation between the quantity of carbonates inside the batteries A–F per Ah battery capacity and their cycle life (cycle counts) after the cycle life test 2 is shown in FIG. 3.

As is apparent from FIG. 3, batteries with less carbonates are also found to have a better cycle life characteristic after the test 2.

It is true that the battery life is dependent on the charge/discharge conditions such as the value of charge/discharge current, charge depth and the like. As clearly understood from FIG. 2 and FIG. 3, the present results show that the batteries with a better cycle life characteristic have less carbonates inside the batteries upon termination of the battery life under either test conditions.

Conventional nickel-metal hydride storage batteries have been found to endure 500 cycles under the charge/discharge conditions as applied in the cycle life test 2. The battery "A" corresponds to the conventional battery. Accordingly, in order to improve the cycle life characteristic of battery higher than the conventional level, it is preferable to regulate the quantity of carbonates permitted to exist inside the battery upon termination of the battery life to not more than 150 mg/Ah as shown in Table 2. Further regulation down to not more than 60 mg/Ah is preferable, because it will lead to drastic elongation of the cycle life to 800 cycles or more, which is 1.6-fold compared to the conventional value.

The methods for reducing the quantity of carbonates inside the battery include a measure of optimizing the graft polymerization conditions, in addition to a measure of vigorous washing of the separator material after graft polymerization for sufficient removal of nonreacted products and impurities. However, from the aspect of industrial yields of separators, the treatment on separators for reducing the quantity of carbonates inside the battery is limited. In consideration of the industrial feasibility, it is most preferable to hold the quantity of carbonates inside the battery at the end of battery life in a range of 20 to 60 mg/Ah.

It is still unknown why the cycle life characteristic is impaired in association with increased carbonates inside the battery. However, when the tested batteries were disassembled and the collected positive electrodes and the negative electrodes were charged and discharged singly for testing, it was found that in negative electrodes with more carbonates, the hydrogen storage alloy as the negative electrode was oxidized and the degree of polarization during discharge was higher. From-these results, it was speculated that carbonates may act to oxidize and inactivate the hydrogen storage alloy as the negative electrode material, which in turn causes impaired cycle life characteristic of the battery.

Self-discharge Characteristic

Subsequently, in an attempt to grasp whether any measure for reducing the graft ratio of acrylic acid in order to best eliminating carbonates remaining inside the battery would have any adverse effect on the battery characteristics, the inventors investigated the relation of the graft ratio of the acrylic acid modified onto the surfaces of the resin as a separator material to the self-discharge characteristic of the battery including such separator material.

As a result, it was shown that even if the graft ratio of acrylic acid was varied, there was a tendency of similar relations of the quantity of carbonates inside the battery and the battery cycle life characteristic to that observed in the above-mentioned cycle life tests 1 and 2. From these results, the inventors found that the quantity of carbonates permitted to exist inside the battery is preferably not more than 150 mg/Ah battery capacity, most preferably in a range of 20 to 60 mg/Ah.

In addition, AGPP's, which were low in graft ratio of acrylic acid onto the surfaces of the resin separator, facilitated washing as a post-treatment for removing impurities, etc. If the same washing conditions were applied, the lower the graft ratio, the less the quantity of carbonates inside the battery remaining upon the end of cycle life.

The above results indicated that as far as the cycle life characteristic is concerned, it is better to reduce the graft ratio of acrylic acid to the whole AGPP to the extent where the electrolyte absorption of the AGPP separator is not impaired. However, since reduced graft ratio adversely advances self-discharge of the battery and lowers the ratio of the discharge capacity retained after storage of the battery to the initial value, it is necessary to determine an optimal graft ratio.

This compelled the inventors to determine the relation of the graft ratio of acrylic acid onto the surfaces of resin separators to the self-discharge characteristic of the batteries including those separators. In the test for determining the self-discharge characteristic, the batteries were charged for 72 min at a current of 1.8 A (1 CA) and discharged at a current of 1.8 A (1 CA) until the terminal voltage decreased down to 1.0 V. The discharge capacity obtained at that time from the respective battery was regarded as 100% and defined as the initial discharge capacity of that battery. After the test, the batteries were further charged for 72 min at a current of 1.8 A (1 CA), and, after storage in an ambient temperature of 45° C. for 2 weeks, were discharged at a current of 1.8 A (1 CA) until the terminal voltage decreased down to 1.0 V. In this way, the discharge capacity after storage was measured and the capacity retention ratio compared to the initial discharge capacity was then determined. This ratio represents the battery self-discharge characteristic. The results are shown in FIG. 4.

Figure 4:
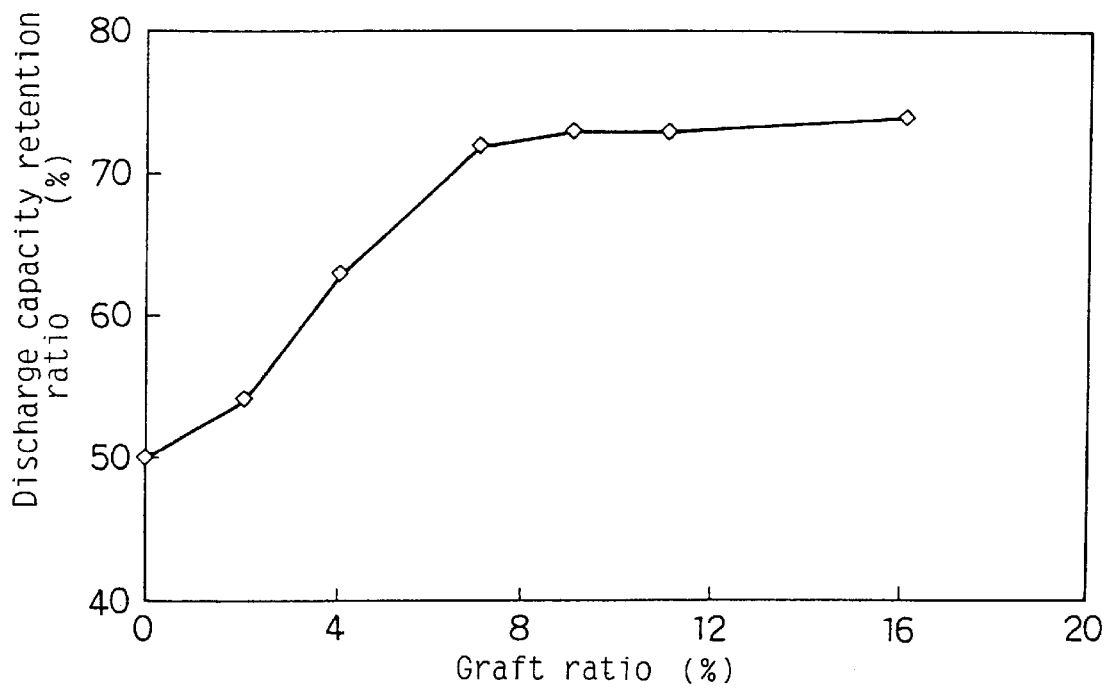
FIG. 4 is a diagram showing a relation between a graft ratio of acrylic acid onto the surfaces of resin as a separator and a discharge capacity retention ratio after charging those batteries including such a separator and subsequent storage of the batteries for 2 weeks in an ambient temperature of 45° C.

As is apparent from FIG. 4, when the graft ratio of acrylic acid is lowered, self-discharge of the battery advances, with a reduction in capacity retention ratio. In consideration of practical use, batteries are desired to hold capacity retention ratios not less than 60% even after storage in charged state in an ambient temperature of 45° C. for 2 weeks. For securing such ratio, the graft ratio of acrylic acid onto the surfaces of the resin separator must be 4 wt % or more. Furthermore, taking into account the capacity retention ratio after storage and the cycle life characteristic of the battery, graft ratios of acrylic acid are preferably 4 to 16 wt %. If the graft ratios are held in a range of 7 to 11 wt %, a capacity retention ratio exceeding 70% can be secured even after storage of the battery in charged state in an ambient temperature of 45° C. for 2 weeks. Moreover, graft ratios in a range of 7 to 11 wt % facilitate removal of nonreacted products of acrylic acid and impurities such as polymerization initiator and the like remaining in the separator material after graft polymerization by the routine industrial washing treatment in running water, so that those ratios are most preferable.

After the test, the inventors found that in nickel-metal hydride storage batteries using AGPP as a separator, important factors are the quantity of carbonates inside the battery with respect to the battery cycle life characteristic and the graft ratio with respect to the self-discharge characteristic of the battery, respectively. This means that in producing AGPP, stable graft polymerization of acrylic acid onto polypropylene is mandatory. In other words, in order to secure stable graft ratio of acrylic acid in AGPP, firm and tight graft polymerization of acrylic acid onto polypropylene without fear of easy separation of acrylic acid from the surfaces upon contact of AGPP with an alkaline electrolyte is required.

The following alkali resistance test can be one measure to determine stable graft polymerization of acrylic acid.

Alkali Resistance Test

In the alkali resistance test, AGPP's were immersed in a 7.2 mol/l KOH aqueous solution kept at 65° C. for 1 week, and changes in weight before and after the test were measured.

For instance, it has already been known that in an AGPP with a graft ratio of 9 wt %, if the graft polymerization with ultraviolet ray irradiation as described before is done by maintaining the separator material at 90° C., the acrylic acid is stably graft-polymerized on the AGPP. If such AGPP is challenged by the above-mentioned alkali resistance test, substitution of H with K occurs in the AGPP, which causes a conversion of COOH to COOK and the weight of AGPP increases. In fact, such AGPP was increased in weight by 2% after the alkali resistance test, compared to the value before the test.

It has already proven that even if the graft ratio of acrylic acid is the same 9 wt %, the AGPP produced by holding the temperature of the separator material at 80° C. during graft polymerization with ultraviolet ray irradiation includes poorly graft-polymerized acrylic acid which is easy to separate from the AGPP. When this AGPP was challenged with the alkali resistance test, it was reduced in weight by 6% after the test, compared to the value before the test. This may be because the poorly graft-polymerized acrylic acid on the surfaces of polypropylene was liberated from the AGPP to escape in the KOH aqueous solution.

As such, the alkali resistance test can be one measure for grasping the stability of graft polymerization of acrylic acid in AGPP's. It is preferable for AGPP's having acrylic acid graft ratios from 4 to 16 wt % to increase in weight after the alkali resistance test by 0.3 to 4% of the value before the test.

In the foregoing embodiments, nonwoven polypropylene fabric sheets prepared by graft polymerization of acrylic acid onto the surfaces of polypropylene resin were used as separators. The present invention, however, is not limited to these materials and those prepared by graft polymerization of any hydrophilic compound that has a carboxyl group, such as methacrylic acid or a combination of acrylic acid and methacrylic acid, onto the surfaces of resin may also be used as separators. Concerning the form of separator material, any form, for example, woven fabric or film, in addition to nonwoven fabric, may be used. Any polyolefine resin materials, such as polyethylene, propylene-ethylene copolymer and the like, may be applicable as the material.

With respect to the fiber for constituting separators, ones comprising several different fibers are preferable. For example, a woven or nonwoven fabric separator material prepared by intermingling polyolefine resin fibers with a thin filament diameter of 2 to 8 $\mu$m and those with thick filament diameter of 9 to 15 $\mu$m in a certain ratio is enhanced in nerve and gas permeability, so that it can further improve the cycle life characteristic if used in a battery.

In the foregoing embodiments, nickel-metal hydride storage batteries were used as the batteries to which those separators should be applied, but any alkaline storage batteries including hydrogen storage alloy negative electrodes, such as manganese dioxide-metal hydride storage battery, may also be used. The present invention is also effective for an alkaline storage battery including a cadmium negative electrode.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An alkaline storage battery comprising a positive electrode comprising nickel hydroxide, a negative electrode comprising a hydrogen storage alloy or cadmium, a separator and an aqueous alkaline electrolyte, said separator being a woven or non-woven fabric sheet or a porous film of polyolefin resin of which surfaces have been modified with a hydrophilic compound having a carboxyl group by graft-polymerization, wherein a quantity of carbonates permitted to exist in said battery is regulated to not more than 150 mg/Ah battery capacity.

2. The alkaline storage battery in accordance with claim 1, wherein said graft-polymerized hydrophilic compound having a carboxyl group includes at least one of acrylic acid and methacrylic acid and a graft modification ratio of said hydrophilic compound to the whole separator material is 4 to 16 wt %.

3. The alkaline storage battery in accordance with claim 2, wherein said graft modification ratio of said hydrophilic compound to the whole separator material is 7 to 11 wt %.

4. An alkaline storage battery comprising a positive electrode comprising nickel hydroxide, a negative electrode comprising a hydrogen storage alloy or cadmium, a separator and an aqueous alkaline electrolyte, said separator being a woven or non-woven fabric sheet of polyolefin resin of which surfaces have been modified with at least one of acrylic acid and methacrylic acid by graft-polymerization, wherein a quantity of carbonates permitted to exist inside said battery upon a reduction in discharge capacity to 60% or less of an initial value after repeated charge/discharge cycles is regulated to not more than 150 mg/Ah battery capacity.

5. The alkaline storage battery in accordance with claim 4, wherein said charge/discharge cycle is performed under conditions of charging at a current of 0.1 CmA for 15 hours and discharging at a current of 0.2 CmA until the terminal voltage decreases down to 1.0 V.

6. The alkaline storage battery in accordance with claim 4, wherein a graft modification ratio of said acrylic acid or methacrylic acid onto surfaces of said polyolefin resin to the whole separator material is 4 to 16 wt %.

7. The alkaline storage battery in accordance with claim 6, wherein said graft modification ratio of said acrylic acid or methacrylic acid to the whole separator material is 7 to 11 wt %.

8. An alkaline storage battery comprising a positive electrode comprising nickel hydroxide, a negative electrode comprising a hydrogen storage alloy or cadmium, a separator and an aqueous alkaline electrolyte, said separator being a woven or non-woven fabric sheet of polyolefin resin of which surfaces have been modified with at least one of acrylic acid and methacrylic acid by graft-polymerization at a graft modification ratio of 7 to 11 wt % to the whole separator material, wherein a quantity of carbonates permitted to exist inside said battery upon a reduction in discharge capacity to 60% or less of an initial value after repeated charge/discharge cycles is regulated to 20 to 60 mg/Ah battery capacity.

9. The alkaline storage battery in accordance with claim 8, wherein said charge/discharge cycle is performed under conditions of charging at a current of 0.1 CmA for 15 hours and discharging at a current of 0.2 CmA until the terminal voltage decreases down to 1.0 V.

* * * * *